US010764081B2

(12) United States Patent
Lott et al.

(10) Patent No.: US 10,764,081 B2
(45) Date of Patent: Sep. 1, 2020

(54) ASYNCHRONOUS COMMUNICATIONS USING HOME AUTOMATION SYSTEM

(71) Applicant: Vivint, Inc., Provo, UT (US)

(72) Inventors: Timothy Lott, Orem, UT (US); Brandon Bunker, Highland, UT (US)

(73) Assignee: Vivint, Inc., Provo, UT (US)

( * ) Notice: Subject to any disclaimer, the term of this patent is extended or adjusted under 35 U.S.C. 154(b) by 202 days.

(21) Appl. No.: 14/444,822

(22) Filed: Jul. 28, 2014

(65) Prior Publication Data
US 2016/0028670 A1 Jan. 28, 2016

(51) Int. Cl.
*G06F 15/16* (2006.01)
*H04L 12/28* (2006.01)
*H04L 12/58* (2006.01)

(52) U.S. Cl.
CPC .......... *H04L 12/2834* (2013.01); *H04L 51/14* (2013.01)

(58) Field of Classification Search
CPC ..... G06Q 10/107; H04L 12/585; H04L 12/58; H04L 51/14; H04L 12/2834; H04L 12/581
USPC ........................................................ 709/206
See application file for complete search history.

(56) References Cited

U.S. PATENT DOCUMENTS

| | | | | |
|---|---|---|---|---|
| 6,756,998 B1 * | 6/2004 | Bilger | ............... | H04L 12/2803 715/734 |
| 6,980,117 B1 * | 12/2005 | Kirkland | ............... | G08B 13/08 340/5.7 |
| 8,086,757 B2 * | 12/2011 | Chang | ............... | H04L 12/2834 340/12.32 |
| 8,190,275 B2 * | 5/2012 | Chang | ............... | H02J 3/14 700/19 |
| 2001/0044840 A1 * | 11/2001 | Carleton | ............. | H04L 43/0811 709/223 |
| 2003/0040813 A1 * | 2/2003 | Gonzales | ............. | H01H 15/005 700/19 |
| 2004/0138768 A1 * | 7/2004 | Murray | ................. | G09B 25/00 700/90 |
| 2004/0215816 A1 * | 10/2004 | Hayes | ................ | H04L 12/2803 709/238 |
| 2005/0132010 A1 * | 6/2005 | Muller | .................... | H04L 51/22 709/206 |
| 2005/0135407 A1 * | 6/2005 | Mora | .................... | H04L 12/413 370/445 |
| 2006/0004911 A1 * | 1/2006 | Becker | ................ | G06Q 10/107 709/207 |
| 2006/0026253 A1 * | 2/2006 | Kessen | ................ | G06Q 10/107 709/207 |
| 2006/0080468 A1 * | 4/2006 | Vadlamani | .............. | G06F 9/548 709/250 |
| 2006/0165161 A1 * | 7/2006 | Kim | .................... | H04L 12/2803 375/222 |
| 2007/0032225 A1 * | 2/2007 | Konicek | .......... | H04M 1/72513 455/417 |
| 2007/0080801 A1 * | 4/2007 | Weismiller | ............ | G01S 5/0226 340/539.13 |

(Continued)

*Primary Examiner* — Razu A Miah
(74) *Attorney, Agent, or Firm* — Holland & Hart, LLP

(57) ABSTRACT

Methods and systems are described for communicating messages using a home automation system. An example computer-implemented method for communicating messages using a home automation system includes generating a message, establishing at least one condition related to delivery of the message, and delivering the message via the home automation system when the at least one condition is met.

17 Claims, 10 Drawing Sheets

(56) References Cited

U.S. PATENT DOCUMENTS

| | | | | |
|---|---|---|---|---|
| 2007/0174389 A1* | 7/2007 | Armstrong | G06F 3/0482 | 709/204 |
| 2008/0258913 A1* | 10/2008 | Busey | G08B 21/0415 | 340/540 |
| 2008/0271123 A1* | 10/2008 | Ollis | G08C 17/02 | 726/4 |
| 2009/0066534 A1* | 3/2009 | Sivakkolundhu | H04L 12/281 | 340/4.32 |
| 2009/0195352 A1* | 8/2009 | Bennett, III | H04L 12/2803 | 340/5.1 |
| 2010/0082176 A1* | 4/2010 | Chang | H02J 3/14 | 700/295 |
| 2010/0097225 A1* | 4/2010 | Petricoin, Jr. | G07C 9/00111 | 340/573.1 |
| 2011/0046792 A1* | 2/2011 | Imes | H04L 63/105 | 700/278 |
| 2011/0208822 A1* | 8/2011 | Rathod | G06F 16/9535 | 709/206 |
| 2012/0023151 A1* | 1/2012 | Bennett, III | H04L 12/2803 | 709/202 |
| 2012/0059767 A1* | 3/2012 | Uthmann | G06Q 90/00 | 705/319 |
| 2012/0069246 A1* | 3/2012 | Thornberry | G08B 15/002 | 348/730 |
| 2013/0031604 A1* | 1/2013 | Esselink | H04W 12/06 | 726/3 |
| 2013/0076528 A1* | 3/2013 | Boettner | G06F 19/3418 | 340/870.02 |
| 2013/0249688 A1* | 9/2013 | Nguyen | H04L 12/2825 | 340/539.13 |
| 2013/0268357 A1* | 10/2013 | Heath | G06Q 30/02 | 705/14.53 |
| 2013/0331087 A1* | 12/2013 | Shoemaker | H04L 67/125 | 455/420 |
| 2014/0095683 A1* | 4/2014 | Knowles | H04L 67/2833 | 709/223 |
| 2014/0266669 A1* | 9/2014 | Fadell | G05B 19/042 | 340/501 |
| 2014/0306833 A1* | 10/2014 | Ricci | B60Q 1/00 | 340/901 |
| 2015/0009274 A1* | 1/2015 | Cho | G08B 13/19684 | 348/14.04 |
| 2015/0116075 A1* | 4/2015 | Cregg | E05B 45/00 | 340/3.7 |
| 2015/0160635 A1* | 6/2015 | Schofield | G07C 9/00571 | 700/90 |
| 2015/0163651 A1* | 6/2015 | Tuck | H04W 4/22 | 370/259 |
| 2015/0227890 A1* | 8/2015 | Bednarek | G06Q 10/08355 | 705/26.81 |
| 2015/0293509 A1* | 10/2015 | Bankowski | G05B 15/02 | 700/275 |
| 2015/0309484 A1* | 10/2015 | Lyman | G05B 13/0205 | 700/275 |
| 2015/0309487 A1* | 10/2015 | Lyman | H04L 12/2827 | 700/275 |
| 2016/0021038 A1* | 1/2016 | Woo | H04L 51/046 | 709/206 |
| 2016/0028670 A1* | 1/2016 | Lott | H04L 51/14 | 709/206 |

* cited by examiner

ASYNCHRONOUS COMMUNICATIONS USING HOME AUTOMATION SYSTEM

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, opportunities exist for improved communications between users of a home automation and security system.

SUMMARY

Methods and systems are described for communicating messages using a home automation system. An example computer-implemented method for communicating messages using a home automation system includes generating a message, establishing at least one condition related to delivery of the message, and delivering the message via the home automation system when the at least one condition is met.

In one example, the at least one condition may include at least one of a date and a time. The at least one condition may include a geo location or a change in geo location. The message may include at least one of a text message, an audible message, and a video message. The method may include displaying the message on a control panel of the home automation system. The method may include displaying the message on a mobile computing device. The message may be generated and received by the same person. Generating the message may include generating the message on one of a handheld computing device and a control panel of the home automation system. A first person may generate the message, a second person may meet the at least one condition, and the message may be delivered to the second person. The at least one condition may include a direction of travel. The at least one condition may be a sensed activity that occurs on a property monitored by the home automation system.

Another embodiment is directed to an apparatus for communicating messages using a home automation system. The apparatus includes a processor, a memory in electronic communication with the processor, and instructions stored in the memory that are executable by the processor to generate a message, establish at least one condition related to delivery of the message and deliver the message via the home automation system when the at least one condition is met. The at least one condition being based at least in part on geo location information.

The geo location information may include a change in location of a person that receives the message. The message may be generated at a control panel of the home automation system and delivered at the control panel. Delivering the message may include at least one of displaying a text or video and playing an audible message. The at least one condition may include, in addition to geo location information, at least one of a time, a date, and an activity determined at least in part using the home automation system.

A further embodiment relates to a computer-program product for communicating messages using a home automation system. The computer-program product includes a non-transitory computer-readable medium storing instructions executable by a processor to generate at least one message, establish a plurality of conditions related to delivery of the at least one message, determine with the home automation system whether the plurality of conditions are met, and deliver the message to at least one recipient after determining that the plurality of conditions are met.

In one example, the plurality of conditions may include geo location. The geo location may be determined at least in part by a mobile computing device carried by one or more persons. The plurality of conditions may include at least two conditions from a group of conditions comprising an activity determined using the home automation system, a time, a date, and geo location information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
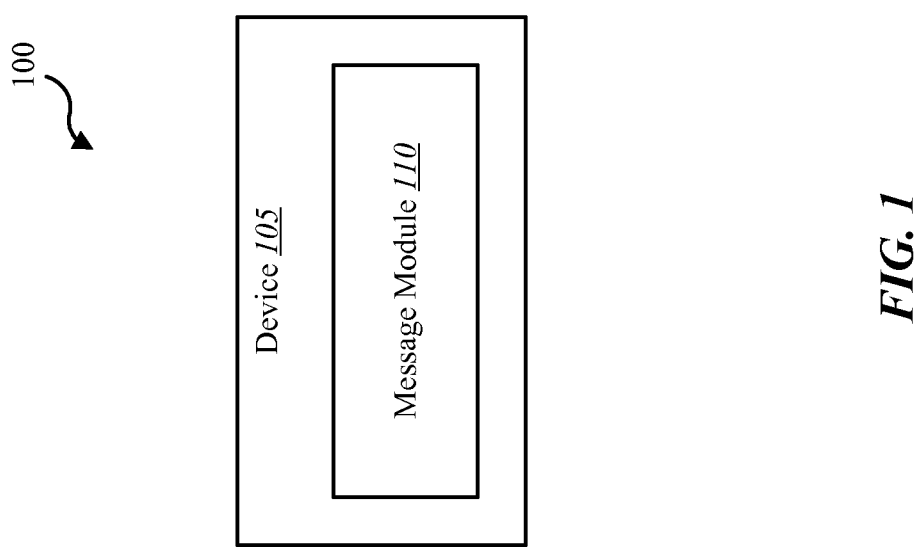
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

One aspect of the present disclosure relates to systems and methods for communicating messages using a home automation system. The systems and methods described herein facilitate generating a message at any time (e.g., when an idea first comes to mind for a person), and the message is sent at another time, such as a time set by the person generating the message or at a time when certain criteria are met. Generally, the systems and methods disclosed herein provide for asynchronous conversations and/or communications between one or more persons. Generally, the systems and methods provide for generating a message at one time and facilitating delivery and/or receipt of the message at another time, such as a time at which the recipient is most likely to pay attention to or respond to the delivered message.

Various criteria may be used to determine when a message is delivered to a recipient. For example, geo location information associated with the sender and/or receiver may prompt delivery of the message. In other examples, date, time, detected activity, detected location, pre-scheduled calendar events, physiological responses (e.g., body temperature, heart rate, muscle activity, etc.), and the like may be used, separate from or in addition to geo location information, as criteria for when the message is delivered. The same or similar criteria may be used at least in part to determine when a person is prompted to generate a message to be sent or generate the related criteria for delivery of the message. In at least some embodiments, multiple conditions/criteria must be met in order for the message to be delivered. In one example, geo location conditions in combination with other criteria such as date, time, sensed activity, or the like are required in order for the message to be delivered to a recipient.

The sender and recipient of the message may be two different people. The recipient may be a plurality of different people, or a plurality of different electronic devices. In at least some examples, the sender and recipient are the same person. The messages may be generated using many different mediums including, for example, a handheld computing device that operates a mobile application, a control panel of a home automation system, a desktop, tablet, laptop, or other computing device, a camera, an audio recording device, or the like. The message may be received using the same or similar devices including, for example, a handheld mobile computing device such as a smart phone, a control panel, a speaker system, or display of a home automation system, a pager, a global positioning system (GPS) navigation system, or any other computing device whether fixed or mobile. Some example devices for generating or triggering a message and/or event include a smart phone (e.g., that operates a GLU app), a mobile personal emergency response system (MPERS) such as an elderly and/or disabled panic pendant, or a GLU stick (e.g., a child tracking device). Additionally, push notifications may be sent via a smart phone app (GLU), voice and/or text message may be delivered via a security panel of a home automation system, a voice message may be sent using a MPERS device, or a voice message may be delivered via a GLU stick. The delivered message may be in the form of, for example, an audio message, a video message, a text message, a vibration or other tactile message, or the like, as discussed above.

As mentioned, various events and/or criteria may be used to trigger delivery of the message. In one example, a user carrying a smart phone app, an MPERS, or GLU stick arrives at a defined geo-fence. In another example, a user with either a smart phone app, MPERS device or GLU stick departs a defined geo-fence. In a further example, a user meets criteria that constitutes a user-defined or system-defined event or routine such as entering a security code of a home automation system, opening a garage door, turning on a television, operating a vehicle, or the like. Furthermore, delivery of the message may be automated based at least in part on a pre-scheduled calendar event such as a work shift, sports event, music lesson, education course, doctor appointment, or the like.

FIG. 1 is a block diagram illustrating one embodiment of an environment 100 in which the present systems and methods may be implemented. In some embodiments, the systems and methods described herein may be performed at least in part on or using a device 105. Device 105 may include a message module 110. Message module 110 may provide various functions and include a number of other operational modules as described below with reference to FIG. 6. Message module 110 may operate to provide the asynchronous communications described above in which a message is generated at one time and the message is delivered at another time, and delivery of the message is based on one or more criteria or rules.

Device 105 may include, for example, a control panel of a home automation system that is part of or defines environment 100. Alternatively, device 105 may be a handheld computing device that operates a mobile application in the form of, for example, message module 110. Device 105 may communicate or otherwise be linked to a home automation system. In one example, device 105 communicates with a control panel, backend server, or central station of a home automation system. Other computing devices such as desktop computers, tablet computers, laptop computers, or a computing device dedicated solely to operating message module 110 may operate as device 105 and may be part of or in communication with a home automation system.

Message module 110 may facilitate generating one or more messages and later delivery of that message to facilitate asynchronous communications using a home automation system. In one embodiment, message module 110 includes a user interface that permits a user to generate a message. The message may be in the form of, for example, a text, a video, an audio recording, or other input. In one example, message module 110 facilitates generating one or more rules or conditions associated with the message and which control when and/or how the message is delivered. In some embodiments, message module 110 is pre-programmed with the criteria of when and how the message is delivered and the user only controls generation of the message content. The message generated via message module 110 may be a generic message that is generally applicable to all who may receive the message. In other examples, the message generated via message module 110 is customized for a certain person receiving the message, or a specific location, time, event, or other unique criteria, whether that event or criteria is applicable to one or a plurality of message recipients.

One use case example of how device 105 and/or message module 110 operates to provide the asynchronous communication disclosed herein relates to a wife that interfaces with message module 110 to set up notification alerts for when her husband arrives at or leaves work. As part of the notification alert setup, the wife creates a message that will be sent to the husband when, for example, he leaves work. When the husband leaves work at 5:30 p.m., two notifications may be sent. A first notification may be sent to the wife indicating that the husband has left work. A second notification may be sent to the husband with the message from the wife that says, "pick up pizza for dinner."

Message module 110 may coordinate generation and delivery of the notifications/messages to the wife and husband. Message module 110 may operate at least in part based on geo location information associated with the husband, which indicates his location arriving at or leaving his place of work. Other indicators may be used in place of geo location information such as, for example, the husband turning on his car within a certain time period (e.g., between 4:00 and 7:00 p.m.), the husband turning on or off his work computer, the husband using a particular computing device such as a cell phone, a navigation system, a tablet computing device (e-reader), or other activity that indicates he is arriving and/or leaving his work location. In some examples, only one or the other of the notifications sent to the wife and the husband may be delivered when the husband leaves work. In one embodiment, a time delay is implemented for delivery of the message after the husband leaves his place of work. This time delay may optimize the timing of the message receipt. Additionally, the notification may be re-sent a certain amount of time after the first notification is sent to either the husband or wife. Alternatively, a separate notification may be sent at a predetermined delay after the first notification is sent (e.g., a first notification at the time the husband leaves work and a follow-up message with different content 15 minutes after the husband leaves work).

Another use case example involves a set of parents leaving their home to go on a date. The parents know that their son is going to be home from work while they are away on their date, and they want the son to turn the water off in the garden. The parents may remember that the water needs to be turned off when they are leaving the house, but know it is unlikely that the son will remember to turn off the water if they send a message to him at the time they leave the house, which is potentially hours before the son arrives at home. The parents may enter a message via message module 110 requesting that the son turn off the water in the garden. The parents may also establish a rule or criteria that the message be delivered when the son arrives at home. Message module 110, or more generally device 105 or environment 100, may identify when the son arrives home in any of a variety of ways including, for example, crossing a geo fence, opening a garage door, entering a security code at a control panel, turning on lights, turning on electrical appliances, activating a motion sensor, or the like. Once the son's arrival at the home is confirmed, the message may be delivered in any of a variety of ways including, for example, delivering the message to the son's handheld mobile device, providing an audible message via the home automation system (e.g., control panel and/or speaker system), or via another electronic device operated by or otherwise in communication with the home automation system (e.g., a television, stereo system, appliance display, or the like). Message module 110 may alert the son that a message is available or has been sent. The alert may be in the form of, for example, a text or audible message such as, "check message on control panel," or "message sent to your phone." In another example, a text or audible message is delivered once the son is confirmed on the property or within the home such as, "message from mom, please turn off water in the garden." The message may include, for example, a video recorded by the parents via a handheld mobile device (e.g., smart phone) or the control panel, and which is displayed on the control panel or other display in the home (e.g., TV). The message may be a text message, a diagram, an audible message, or video as mentioned above. The message may be very specific (e.g., turn off water in the south flower garden at 5:30), or generic (e.g., please turn off water).

Another use case example includes the son wearing a geo-tracking device. In one embodiment, the pre-generated message is delivered to the son when the son arrives within a geo-fence (e.g., a GPS app on the son's phone identifies the son is within a home). The message may be displayed on, for example, a fixed user interface such as the control panel of the home automation system inside the home. In another example, the home automation system may generate a chime that indicates that the son should look at the control panel or other display that is in communication with the message module and/or home automation system generally. The message may be displayed on a tracking device carried by the son (e.g., on a display screen of a tracking device that is wearable on the son's wrist or worn as a pendant around the son's neck).

A further use case example relates to a child wearing a geo-tracking device that not only provides location information but a direction of travel. For example, if the geo-tracking device indicates the child is traveling in a direction that is not directly towards home during a time period when a child should be returning home from school, a pre-generated message may be sent to the child (e.g., via the geo-tracking device or a separate mobile computing device) inquiring about the child's activity (e.g., "you're not headed home, where are you going?"), or giving directions (e.g., "please turn around and come home"). The delivery of such messages may be based on multiple criteria including, for example, the day of the week, the time of the day, the particular child I.D., as well as geo location information (e.g., direction of travel and/or location).

In a still further use case example, the message is delivered to the same person who generates the message. The delivered message may be a reminder that is sent based on rules that are created by the person who generates the message. For example, the message may include a reminder such as, "remember to pick up Johnny from football at 4:00" if the time is between 3:30 and 4:00, the home automation system confirms that the recipient is still at home or within a certain geo-fence, and it is the day of the week in which Johnny has a scheduled football practice based on one or more calendar events. In some embodiments, the delivery of the message may be based on a single criterion such as, for example, any of the criteria described in this example. In a related use case example, the reminder is sent to the user when the home automation system determines that the user has returned home alone, or in combination with other criteria such as, for example, the time of day, the day of week, a user identification, or the like.

Message module 110 may receive data from a plurality of different sources as part of generating a message and determining whether the criteria for delivering the message have been met. In some examples, message module 110 may receive data confirming that the message was received by the intended recipient and/or that the intended recipient has acted upon the delivered message. Message module 110 may generate additional notifications and/or messages based on the message recipient's confirmed receipt or activities conducted in response to the received message.

Figure 2:
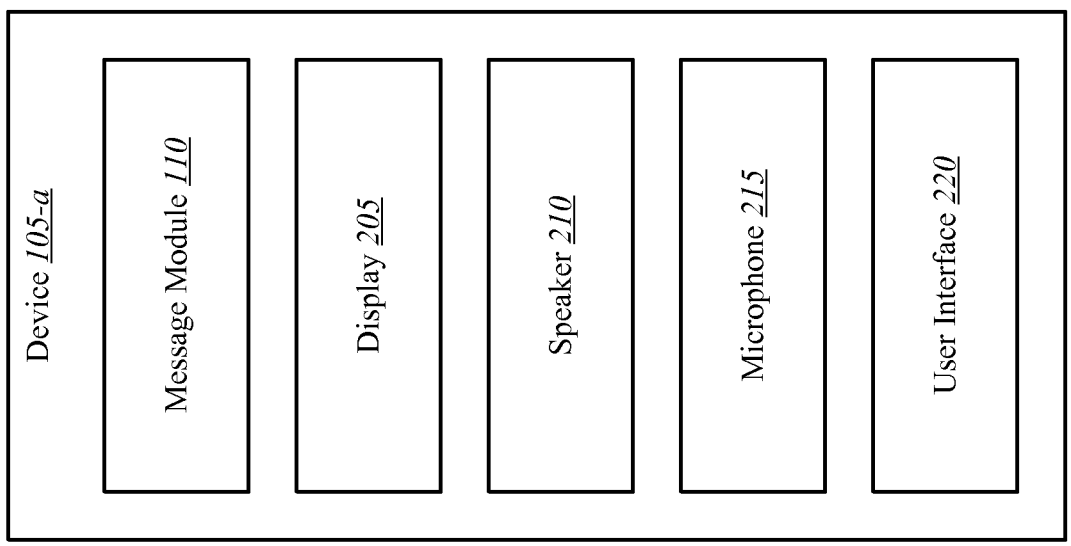
FIG. 2 is a block diagram of another environment in which the present systems and methods may be implemented.

FIG. 2 is a block diagram illustrating one embodiment of an environment 200 in which the present systems and methods may be implemented. Environment 200 may include the same or similar components as discussed above related to environment 100. In some embodiments, the systems and methods described herein may be performed at least in part on or using a device 105-a. Device 105-a may include message module 110, and may additionally include one or more of a display 205, a speaker 210, a microphone 215, and a user interface 220. In at least some examples, the user interface 220 may include one or more of the display 205, speaker 210, and microphone 215. Display 205, speaker 210, microphone 215, and user interface 220 may assist in generating one or more messages for delivery to a message recipient, or delivery of a message to a message recipient. For example, a person generating a message may use microphone 215 to generate an audio message. At least some features and/or functions of device 105-a and message module 110 may be voice activated using spoken instructions received via speaker 210. Speaker 210 may repeat the recorded audio message so that the user can confirm that the recorded audio message is accurate. Display 205 may display options for the user to generate the message and set rules and/or criteria associated with delivery of the message. User interface 220 may include, for example, a keypad, touch screen, display, or the like by which the user may interface with device 105-a to generate a message. The message may be delivered to a recipient by displaying a video or text message on display 205, conveying an audible message via speaker 210, request feedback from a recipient via microphone 215 and/or user interface 220, or a combination thereof.

In at least one example, device 105-a is a control panel of the home automation system. The intended message recipient may be required to interface with the control panel as part of entering or departing from a property (e.g., home), and interfacing with the control panel may meet one of the criteria necessary for delivery of the message to the recipient. Device 105-a may be embodied all or in part in all other computing devices such as, for example, a handheld computing device such as a smart phone, tablet computer, laptop computer, or the like.

Figure 3:
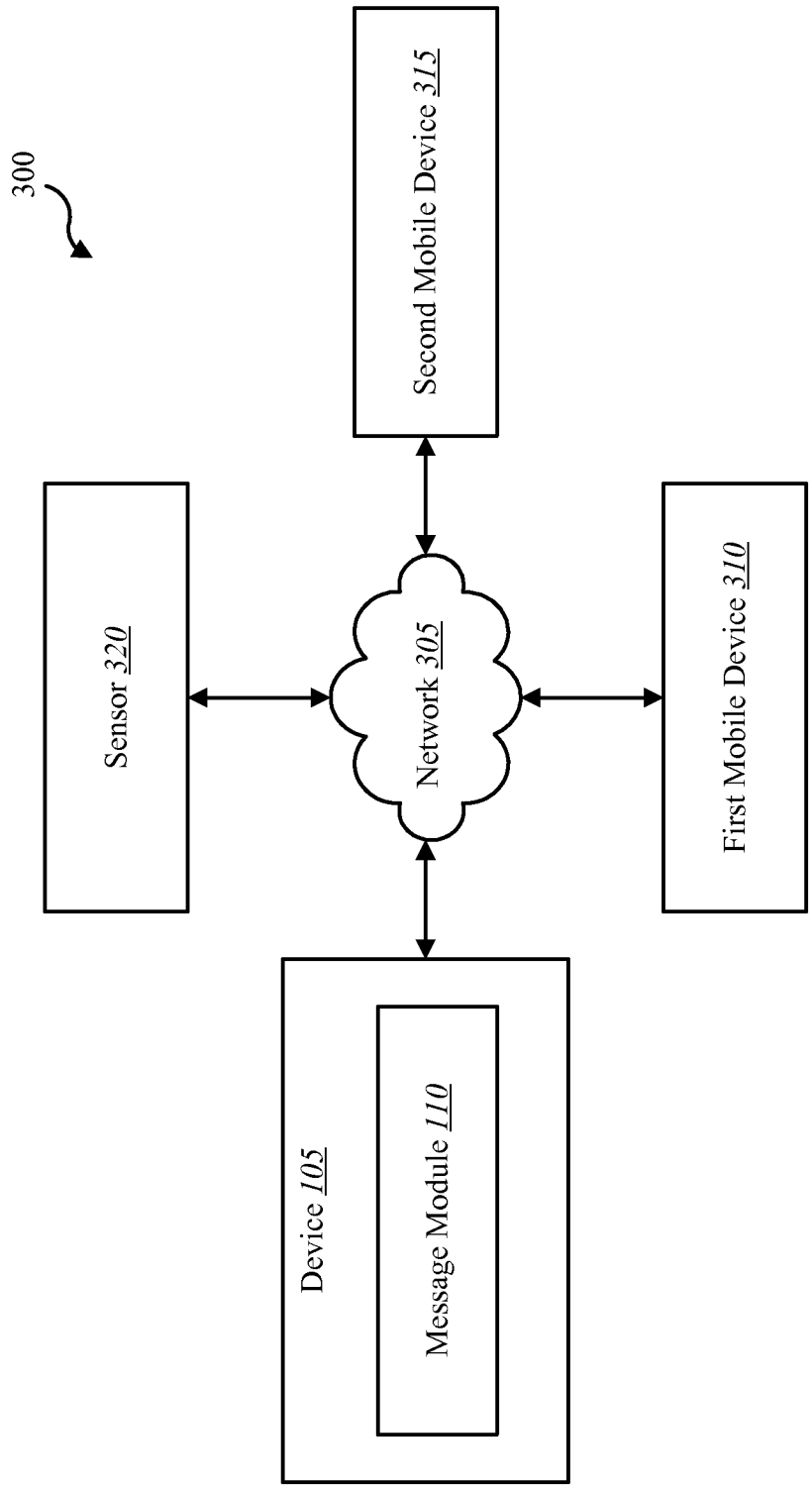
FIG. 3 is a block diagram of another environment in which the present systems and methods may be implemented.

FIG. 3 is a block diagram illustrating one embodiment of an environment 300 in which the present systems and methods may be implemented. Environment 300 may include at least some of the components of environments 100, 200 described above. Environment 300 may include, in addition to device 105 having message module 110, a network 305, a first mobile device 310, a second mobile device 315, and a sensor 320. Device 105, first and second mobile devices 310, 315, and sensor 320 may communicate with each other via network 305. Examples of network 305 include cloud networks, local area networks (LAN), wide area networks (WAN), virtual private networks (VPN), wireless networks (using 802.11, for example), and/or cellular networks (e.g., using 3G and/or LTE), etc. In some embodiments, network 305 may include the internet.

First and second mobile devices 310, 315 may be carried by separate users of the home automation system. First and second mobile devices 310, 315 may be used to generate and/or receive messages via message module 110. Sensor 320 may be used to determine whether certain criteria are met for delivery of one or more messages to a message recipient such as a person carrying first or second mobile device 310, 315.

In one embodiment, device 105 may be a control panel of a home automation system or other fixed device associated with a home automation system. Message module may operate to generate a message and/or criteria associated with delivery of a message. Message module 110 may also receive data used to confirm whether the criteria have been met in order to deliver the message to one or more message recipients. In one example, a first person generates a message via message module 110 at device 105 or via first mobile device 310. The first person may also establish one or more rules or criteria which must be met in order for the message to be delivered via message module 110. The rules/criteria may be established via first mobile device 310 and/or at device 105 via message module 110.

Sensor 320 may be used to determine whether the first person or one or more second persons meets at least one of the criteria required in order to deliver the message. In one example, sensor 320 is a geo location device that determines a location of a second person who carries second mobile device 315. Message module 110 may deliver a message to the second person at the second mobile device 315 when geo location information from sensor 320 indicates an activity or location of the second person. In other examples, the person whose location and/or activity is determined via sensor 320 is different from the person who receives the message via, for example, second mobile device 315. The delivered message may be delivered to multiple persons including, for example, the persons carrying first and second mobile devices 310, 315, which may include the first person who generated the message and/or the criteria for delivery of the message.

Device 105 may include other types of devices in other embodiments including, for example, a back end server, a central station, a desktop computer, a cloud computing device, or the like that is associated with or in some way in communication with a home automation system. Features of the home automation system may be used to generate a message, create rules and/or criteria for delivery of a message, deliver the message, receive confirmation of delivery of the message, and/or confirm actions that occur in response to the delivered message.

Sensor 320 may include, for example, a camera sensor, an audio sensor, a forced entry sensor, a shock sensor, a proximity sensor, a boundary sensor, an appliance sensor, a light fixture sensor, a temperature sensor, a light beam sensor, a three-dimensional (3D) sensor, a motion sensor, a smoke sensor, a glass break sensor, a door sensor, a video sensor, a carbon monoxide sensor, an accelerometer, a global positioning system (GPS) sensor, a Wi-Fi positioning sensor, a capacitance sensor, a radio frequency sensor, a near-field sensor, a heartbeat sensor, a breathing sensor, an oxygen sensor, a carbon dioxide sensor, a brainwave sensor, a voice sensor, a touch sensor, and the like. Device 105 and/or at least one of first and second mobile devices 310, 315 may include one or more of the sensors 320. Although sensor 320 is depicted as a separate component from device 105, in some embodiments, sensor 320 may be connected directly to any one of those components or other components of environment 300. Additionally, or alternatively, sensor 320 may be integrated into a home appliance or fixture such as a lighting fixture.

Sensor 320 may include a plurality of sensors having various sensor capability. For example, sensor 320 may sense physiological responses of one or more persons such as, for example, a heart rate, sleeping state, body temperature, or the like. Sensor 320 may include geo tracking capability such as identifying a geographic location or a direction of travel, or an orientation of a person's body (e.g., standing up or lying down). Sensor 320 may be associated with a building such as a home, and data from sensor 320 may indicate a location and/or activity of one or more persons in the home. In some examples, sensor 320 may operate at least in part to determine whether a message recipient has received the message and/or performed an action in response to receiving a message. Feedback from sensor 320 may be used to create and/or select among various messages that are sent to the person monitored by the sensor. For example, if the person's heart rate or blood pressure as measured by the sensor is outside of predetermined parameters, the message module 110 may send a predetermined message to the person or a care taker of the person based on the sensor data.

Figure 4:
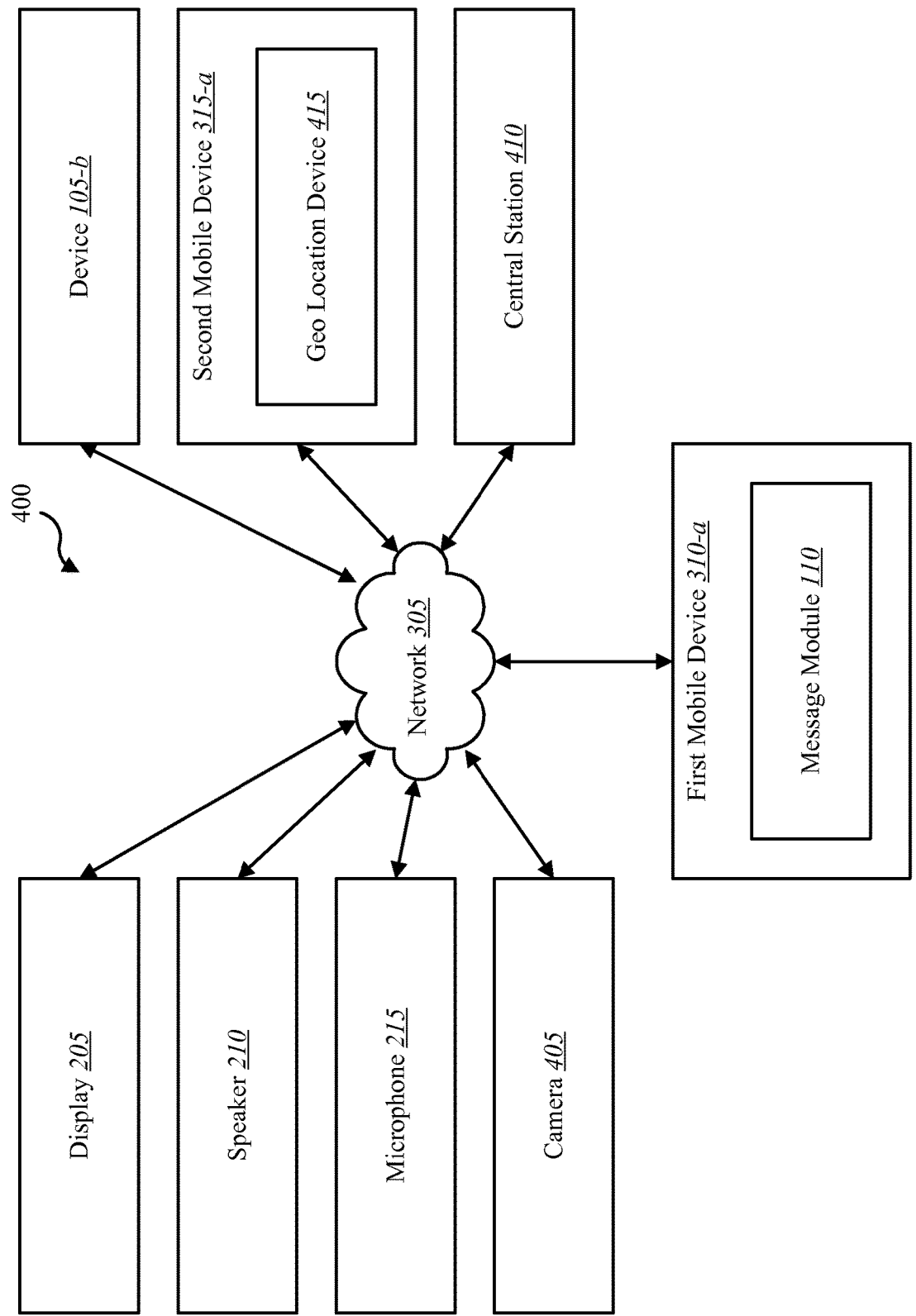
FIG. 4 is a block diagram of another environment in which the present systems and methods may be implemented.

FIG. 4 is a block diagram illustrating one embodiment of an environment 400 in which the present systems and methods may be implemented. Environment 400 may include at least some of the same components of the environments 100, 200, 300 described above. Environment 400 may include a device 105-b, display 205, speaker 210, microphone 215, a first mobile device 310-a having the message module 110, a second mobile device 315-a including a geo location device 415, a camera 405, and a central station 410. The components of environment 400 may communicate via network 305.

Environment 400 illustrates that the message module 110 may operate at least in part on first mobile device 310-a. In some examples, at least portions of message module 110 and/or operation thereof may be carried out on both device 105-a and first mobile device 310-a. Display 205, speaker 210, microphone 215, and camera 405 may be used individually or in combination to generate one or more messages and/or deliver one or more messages to a message recipient. The messages being generated and/or delivered may be routed through and/or in some way controlled via message module 110.

Central station 410 may provide back end support for at least some of the functionality of environment 400. Central station 410 may provide support personnel, data storage, customer service, and the like for a home automation system that includes all or portions of environment 400.

Second mobile device 310-a may have integrated therein geo location device 415. In other examples, geo location device 415 is provided as a separate device and/or component from second mobile device 315-a. Second mobile device 315-a may include, for example, a smartphone or other handheld computing device. Data generated by geo location device 415 may be used by message module 110 to determine whether criteria are met in order to deliver one or more messages. A delivered message may be sent to second mobile device 315-a, conveyed via display 205, speaker 210, microphone 215, or the like, or delivered via some other device, method or system. In one example, device 105-b is a control panel of a home automation system. The message may be conveyed to one or more persons via device 105-b. Device 105-b may include any one of display 205, speaker 210, microphone 215, and camera 405.

In other examples, first mobile device 310-a may include, in addition to message module 110, the geo location device 415. The first mobile device 310-a, which may control generating criteria for, routing of, and delivery of one or more messages, may be the same device by which some of the criteria are met in order to deliver the message.

Figure 5:
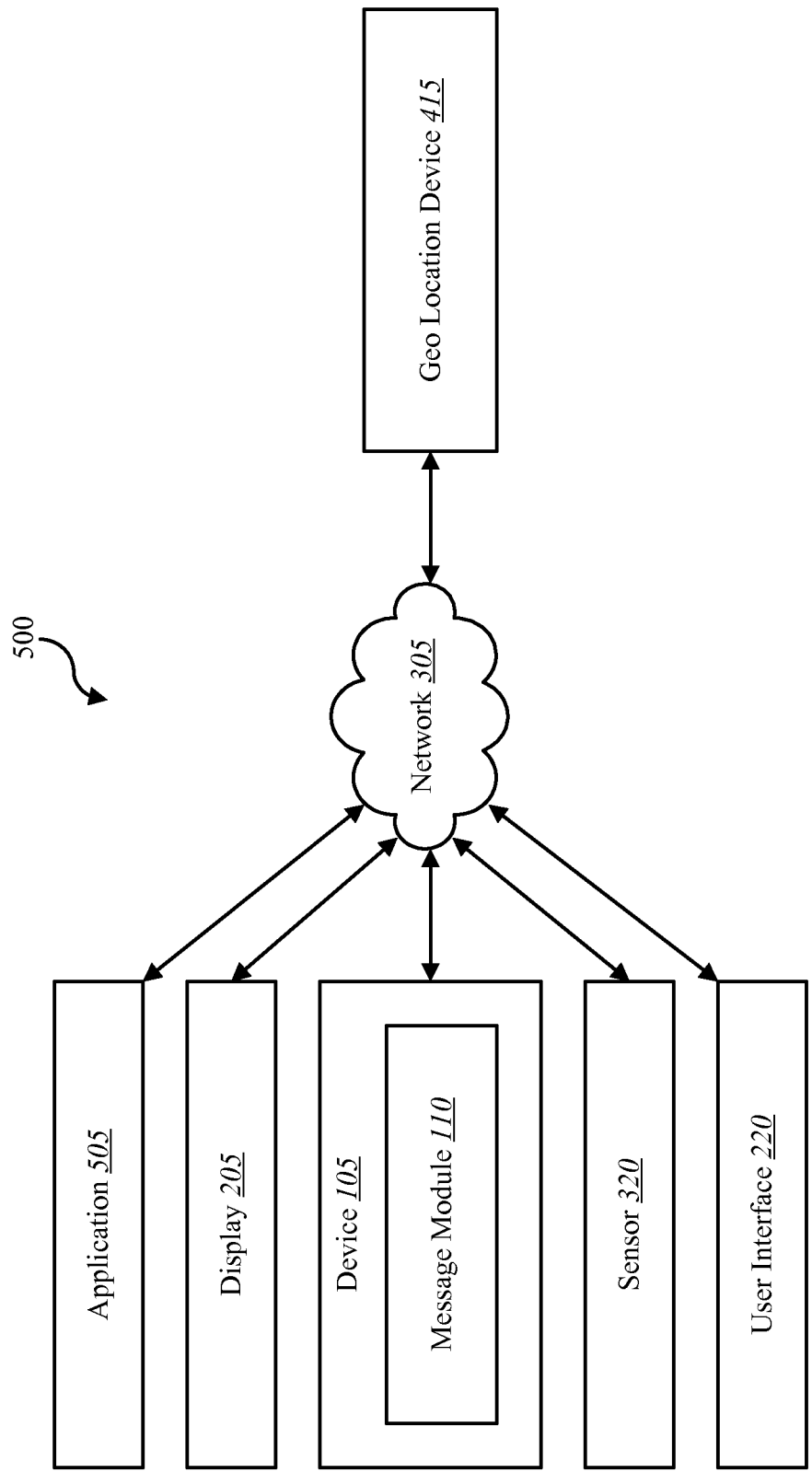
FIG. 5 is a block diagram of another environment in which the present systems and methods may be implemented.

FIG. 5 is a block diagram illustrating one embodiment of an environment 500 in which the present systems and methods may be implemented. Environment 500 may include at least some of the same components as environments 100, 200, 300, 400. Environment 500 may include, in addition to device 105 and message module 110, display 205, user interface 220, network 305, sensor 320, geo location device 415, and application 505. Any of the components of environment 500 may be included in the environments 100, 200, 300, 400 described herein.

At least some of the features and functionality of device 105, message module 110, display 205, user interface 220, network 305, and sensor 320 are described above with reference to FIGS. 1-4. Furthermore, geo location device 415 and its related functionality has been described above with reference to FIG. 4. Geo location device 415 may operate independent of a mobile device such as a handheld computing device. Geo location device 415 may generate and transmit geo location information associated with a person or other object carrying the geo location device 415. Message module 110 may receive the geo location information and determine whether a message should be transmitted based at least in part on the geo location information. The geo location device 415 may be carried by or associated with the objects such as, for example, a vehicle, a pet, a computing device, a person, or the like.

Application 505 may allow a user (e.g., a user interfacing directly with device 105 located at a property being monitored by the home automation system) to control, either directly or via device 105 and/or another mobile computing device, an aspect of the monitored property including security, energy management, locking and unlocking doors, checking the status of the door, locating a user or item, controlling lighting, thermostat, or cameras, and receiving notifications regarding a current status or anomaly associated with a home, office, place of business, and the like (e.g., a property). In some configurations, application 505 may enable device 105 to communicate with geo location device 415, display 205, user interface 220, and/or sensor 320, as well as other devices or systems such as, for example, central station 410 discussed above with reference to FIG. 4. In one example, application 505 may provide the user interface 220 to display an automation, security, and/or energy management content on device 105. Thus, application 505, via user interface 220, may allow users to control aspects of their home, office, and/or other type of property. Further, application 505 may be installed on device 105 or other component and/or feature of the home automation system.

Application 505 may facilitate generation of an alarm/notification in response to location information provided via, for example, geo location device 415. Application 505 may operate to determine when geo location device 415 is no longer in a monitored area such as within a geo fence. The monitored area may be associated with a home or other property being monitored by the home automation system, or may be associated with another location such as, for example, a place of work, a school, a recreation facility, a shopping center, or the like. Application 505 may coordinate with sensor 320 to help determine a location and/or activity of one or more users as part of determining when or whether a message should be delivered to a message recipient.

Display 205 may include, for example, a digital display as part of, for example, a control panel of environment 500 (e.g., a control panel of a home automation system). Display 205 may be part of device 105. Display 205 may be provided via devices such as, for example, a desktop computer or a mobile computing device (e.g., first mobile device 310-a described with reference to FIG. 4). In at least some examples, display 205 may be either permanently mounted (e.g., mounted to a wall of a home), or may be a mobile device or accessible via a mobile device. User interface 220 may be integrated into display 205. Such a user interface 220 may include a plurality of menus, screens, microphones, speakers, cameras, and other capability that permit interaction between the user and the home automation system, or components of environment 500. Additionally, or alternatively, the user interface 220, with display 205, may be integrated into device 105 or other features of a home automation system. Display 205 and/or user interface 220 may provide input of data that is used by message module 115 for purposes of generating a message, criteria associated with delivery of the message, and/or delivery of the message itself.

Figure 6:
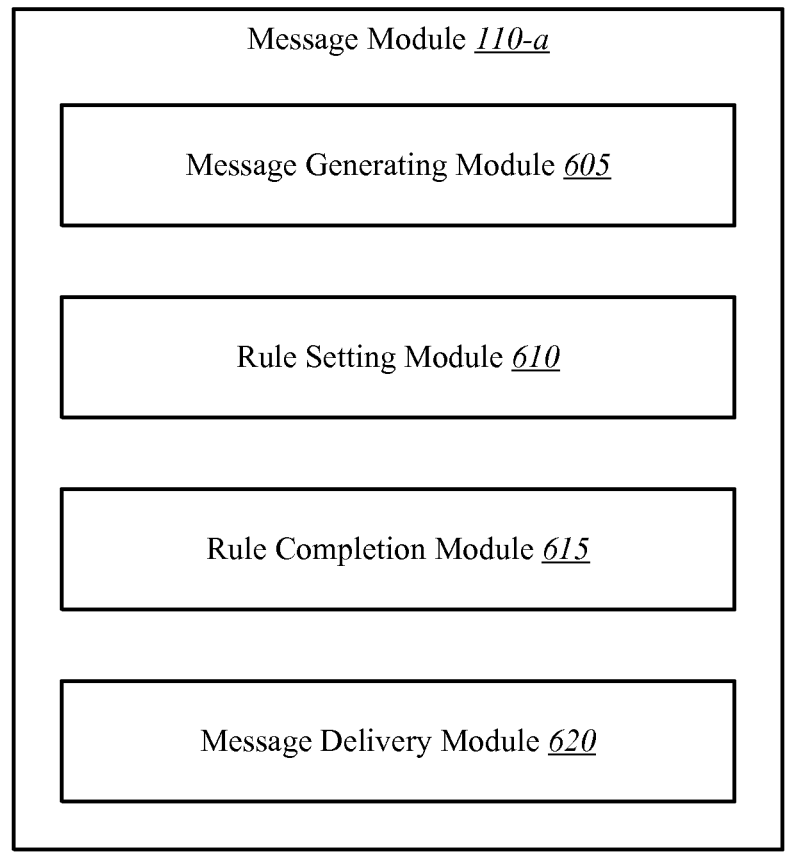
FIG. 6 is a block diagram of a message module of the environments shown in FIGS. 1-5.

FIG. 6 is a block diagram illustrating an example message module 110-a. Message module 110-a may be one example of the message module 110 described above with reference to FIGS. 1-5. Message module 110-a may include a message generating module 605, a rule setting module 610, a rule completion module 615, and a message delivery module 620.

Message generating module 605 may receive data or other input from one or more users to generate a message. The information may be received via, for example, a speaker, a microphone, a camera, or user interface as described above with reference to environments 400, 500. The generated message may be in the form of, for example, a video message, an audio message, a text message, or any other message that may be viewed, felt, or heard.

Rule setting module 610 may receive input and/or instructions related to one or more rules that may be established in connection with when the message is delivered and how the message is delivered. For example, the rule setting module may establish one or more rules associated with a time, a date, a location, and a sensed activity, or the like. A plurality of rules may be associated with each message. The rules may be automatically generated based on other predetermined criteria. Alternatively, the rules may be established via rule setting module based on customized or user specific instructions provided by, for example, the person that generated the message via message generating module 605. The rule setting module 610 may receive instructions via, for example, a speaker, a microphone, or a camera, or other user interface. Rule setting module 610 may prompt a user for responses. For example, rule setting module 610 may generate a series of audible questions that a user may respond to via, for example, a touch screen display, user interface, or microphone as part of establishing one or more rules.

Rule completion module 615 may receive information associated with the one or more rules, criterion or condition. Rule completion module 615 may receive information related to, for example, a location, a date, a time, a sensed activity (e.g., motion detection, operation of an appliance, entry of a security code, operation of a vehicle, or usage of a credit card or computing device, etc.). Rule completion module 615 may compare the received data to the criteria of the one or more rules established by the rule setting module 610. When the criteria for the rule is met, message module 110-a may operate message delivery module 620 to deliver one or more messages. Messages may be delivered through wired or wireless communication. In one example, the message is delivered to a control panel of a home automation system. Additionally, or alternatively, the message is delivered to a handheld computing device carried by one or more persons, which may include the person who generated the message via message generating module 605 or established the rule via rule setting module 610. The message may be delivered to a local device or may be delivered remotely to one or more permanent and/or mobile devices. The message may be delivered to multiple recipients. The message may be delivered in various formats including, for example, both an audio message and a text message depending on, for example, the person receiving the message and the device used to receive and convey the message to one or more persons.

The modules of message module 110-a may be consolidated on a single device. Additionally, or alternatively, portions of one or more of the modules of message module 110-a may be operable on different devices and/or at different locations. For example, a message may be generated via message generation module 605 at a control panel or via an app operated on a handheld mobile device, and the message may be delivered via message delivery module 620 from a central station, a control panel, or a handheld computing device, all of which may be part of a home automation system or be operable via a home automation system.

Figure 7:
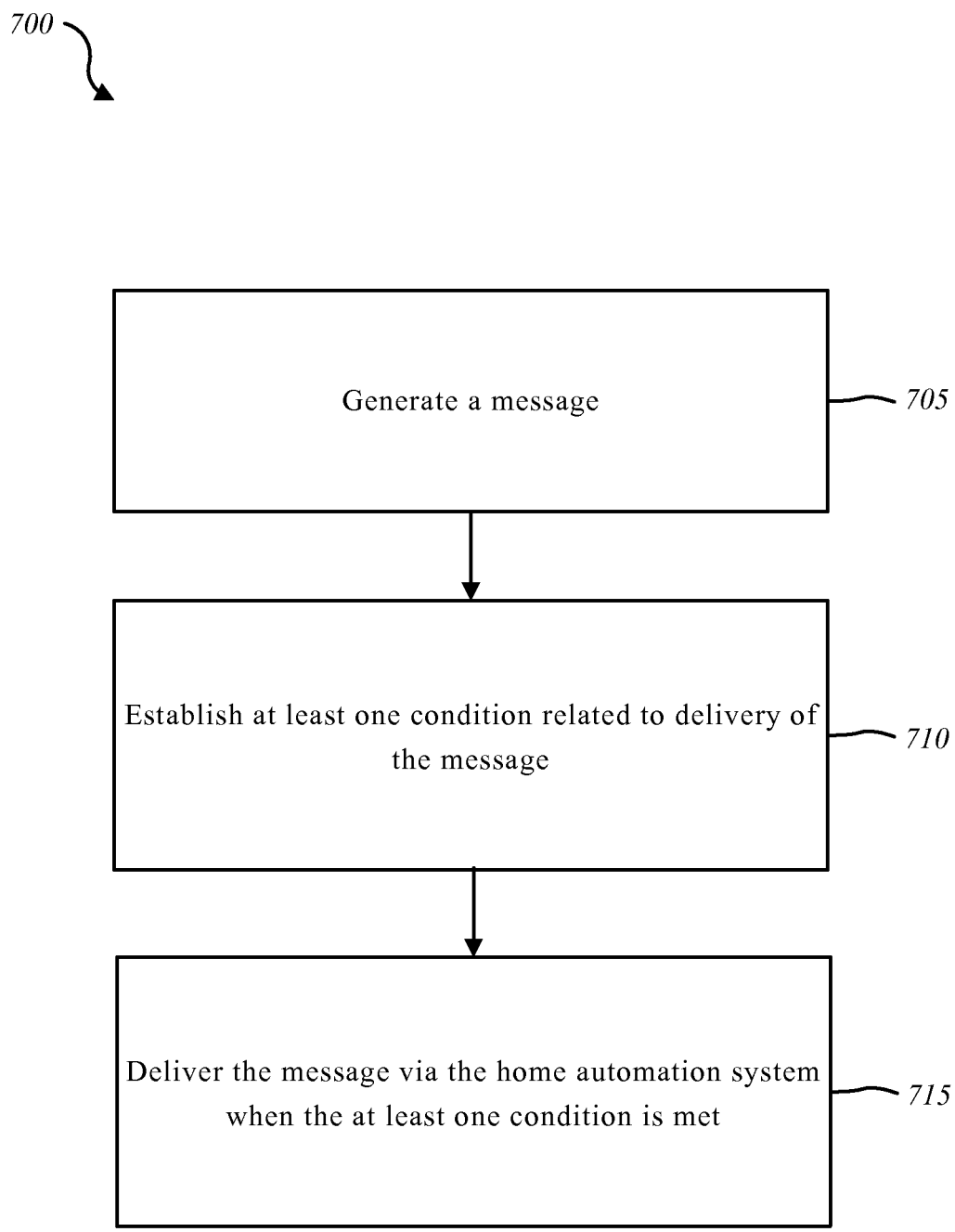
FIG. 7 is a flow diagram illustrating a method for communicating messages using a home automation system.

FIG. 7 is a flow diagram illustrating one embodiment of a method 700 for communicating messages using a home automation system. In some configurations, the method 700 may be implemented by the message module 110-a shown and described with reference to FIGS. 1-6. In other examples, the method 700 may be performed generally by device 105 shown in FIGS. 1-5, or even more generally by environments 100, 200, 300, 400, 500 shown in FIGS. 1-5.

At block 705, the method 700 includes generating a message. Block 710 includes establishing at least one condition related to delivery of the message. At block 715, method 700 includes delivering the message via the home automation system when the at least one condition is met.

In some examples, the method 700 may also provide that the at least one condition includes at least one of a date and a time. The at least one condition may include a geo location or a change in geo location. The message may include at least one of a text message, an audible message, and a video message. The method 700 may include displaying the message on a control panel of the home automation system. The method 700 may include displaying the message on a mobile computing device. The message may be generated and received by the same person. Generating the message may include generating the message on one of a handheld computing device and a control panel of the home automation system. A first person may generate the message, a second person may meet the at least one condition, and the message may be delivered to the first and second persons. The at least one condition may include a direction of travel. The at least one condition may be a sensed activity that occurs on a property monitored by the home automation system.

Figure 8:
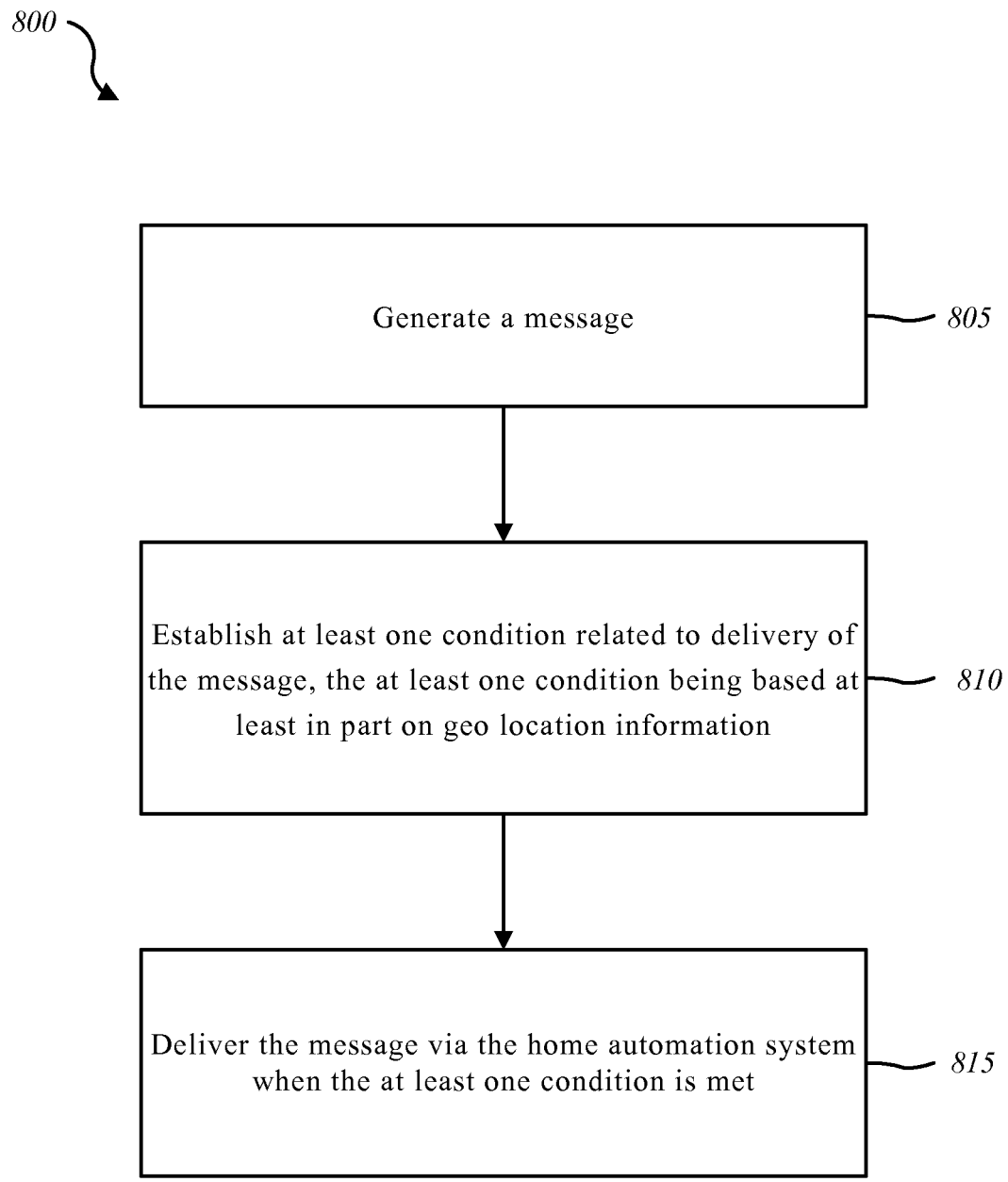
FIG. 8 is a flow diagram illustrating another method for communicating messages using a home automation system.

FIG. 8 is a flow diagram illustrating one embodiment of a method 800 for communicating messages using a home automation system. In some configurations, the method 800 may be implemented by the message module 110 shown and described with reference to FIGS. 1-6. In other examples, the method 800 may be performed generally by device 105 shown in FIGS. 1-5, or even more generally by environments 100, 200, 300, 400, 500 shown in FIGS. 1-5.

At block 805, the method 800 includes generating a message. Block 810 includes establishing at least one condition related to delivery of the message, wherein the at least one condition is based at least in part on geo location information. Block 815 includes delivering the message via the home automation system when the at least one condition is met.

The geo location information according to method 800 may include a change in location of a person that receives the message. The message may be generated at a control panel of the home automation system and may be delivered at the control panel. Delivering the message may include at least one of displaying a text or video, and playing an audio message. The at least one condition may include, in addition to geo location information, at least one of a time, a date, and an activity determined using the home automation system.

Figure 9:
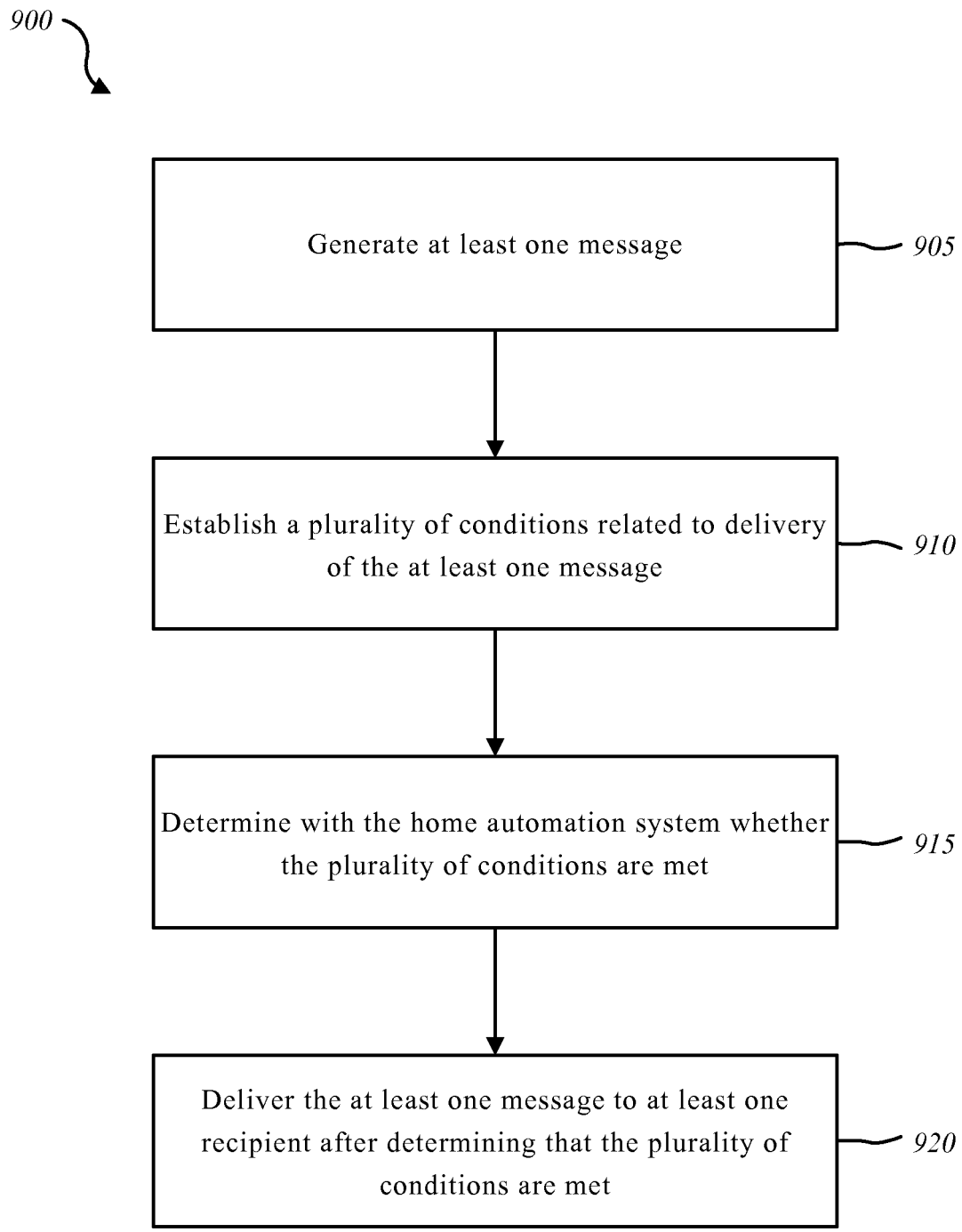
FIG. 9 is a flow diagram illustrating another method for communicating messages using a home automation system.

FIG. 9 is a flow diagram illustrating one embodiment of a method 900 for communicating messages using a home automation system. In some configurations, the method 900 may be implemented by the message module 110 shown and described with reference to FIGS. 1-6. In other examples, the method 900 may be performed generally by device 105 shown in FIGS. 1-5, or even more generally by environments 100, 200, 300, 400, 500 shown in FIGS. 1-5.

At block 905, the method 900 includes generating at least one message. Block 910 includes establishing a plurality of conditions related to delivery of the at least one message. Block 915 includes determining with the home automation system whether the plurality of conditions are met. At block 920, method 900 includes delivering the message to at least one recipient after determining that the plurality of conditions are met.

The plurality of conditions according to method 900 may include geo location information. The geo location may be determined at least in part by a mobile computing device carried by one or more persons. The plurality of conditions may include at least two conditions from a group of conditions comprising an activity determined using the home automation system, a date, a time, and geo location information.

Figure 10:
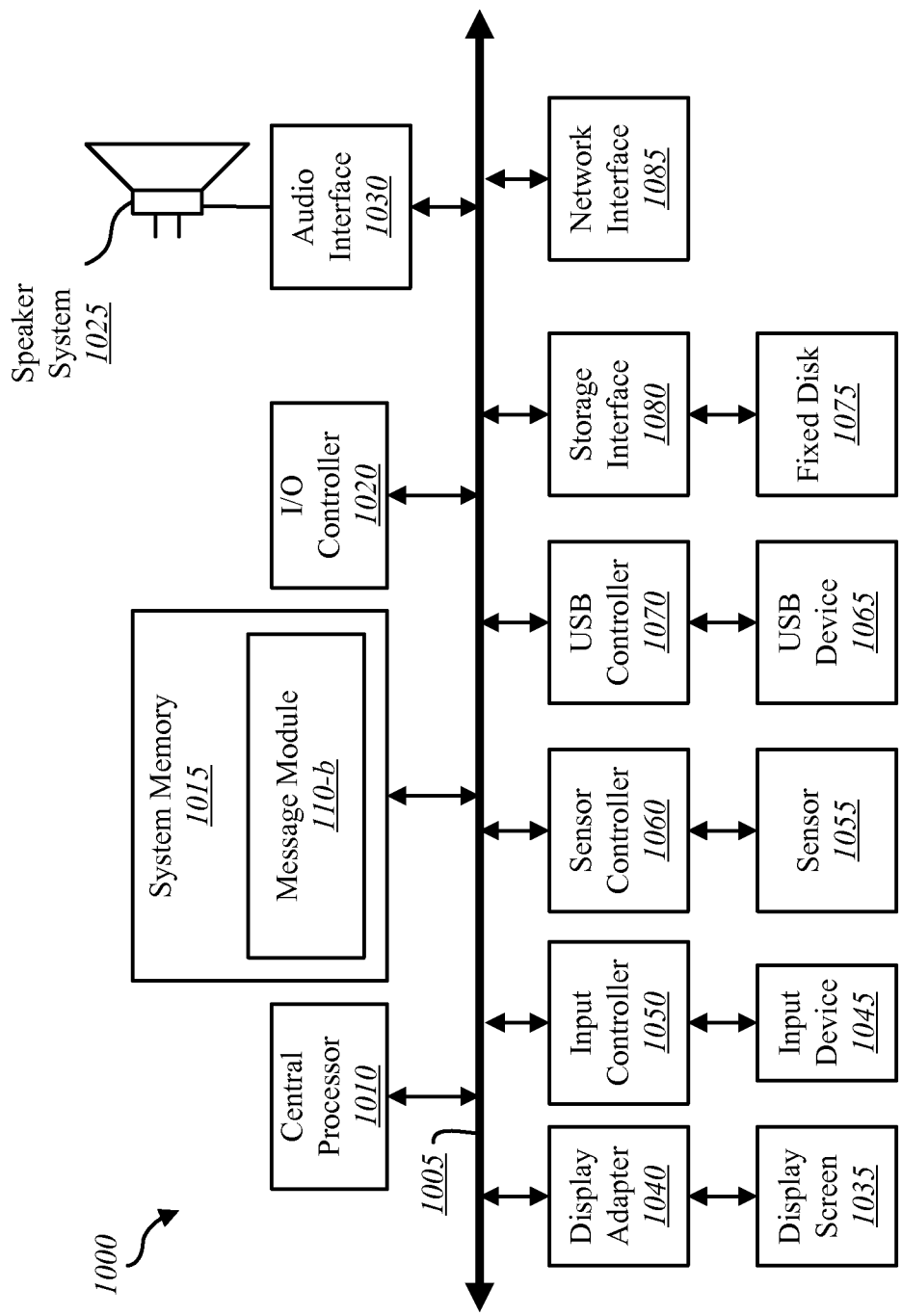
FIG. 10 is a block diagram of a computer system suitable for implementing the present systems and methods of FIGS. 1-9.

FIG. 10 depicts a block diagram of a controller 1000 suitable for implementing the present systems and methods. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the message module 110-*b* to implement the present systems and methods may be stored within the system memory 1015. Applications resident with controller 1000 are generally stored on and accessed via a non-transitory computer readable medium, such as a hard disk drive (e.g., fixed disk drive 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk drive 1075. The operating system provided on controller 1000 may be iOS®, ANDROID®, MS-DOS®, MS-WIN-DOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for communicating messages using a home automation system, comprising:
    receiving an input from a first person, wherein the input comprises at least one condition for delaying delivery of a message based on a body temperature, a heart rate, and a muscle activity of a second person, and at least one condition from a group of conditions comprising an activity determined using the home automation system, a time, a date, and geo location information;
    generating a message for the second person based at least in part on the input received from the first person, wherein the message includes at least one of a text message, an audible message, or a video message;
    receiving, at the home automation system, data related to a direction of travel and the body temperature, the heart rate, and the muscle activity of the second person;
    estimating a time that the second person will view the message based at least in part on receiving the data related to the direction of travel and the body temperature, the heart rate, and the muscle activity of the second person;
    generating, at the home automation system, at least one condition for delaying delivery of the message to the second person based at least in part on estimating the time that the second person will view the message using the direction of travel and the body temperature, the heart rate, and the muscle activity of the second person;
    delaying the delivery of the message based at least in part on generating the at least one condition; and
    delivering the message via the home automation system to the second person when the at least one condition is met.

2. The method of claim 1, wherein the at least one condition includes at least one of a date and a time.

3. The method of claim 1, wherein the at least one condition includes a geo location or a change in geo location.

4. The method of claim 1, further comprising:
    displaying the message on a control panel of the home automation system.

5. The method of claim 1, further comprising:
    displaying the message on a mobile computing device.

6. The method of claim 1, wherein the message is generated and received by the same person.

7. The method of claim 1, wherein generating the message includes generating the message on one of a handheld computing device and a control panel of the home automation system.

8. The method of claim 1, wherein the first person generates the message, the second person meets the at least one condition, and the message is delivered to at least one of the first and second persons.

9. The method of claim 1, wherein the at least one condition is a sensed activity that occurs on a property monitored by the home automation system.

10. An apparatus for communicating messages using a home automation system, comprising:
 a processor;
 a memory in electronic communication with the processor; and
 instructions stored in the memory, the instructions being executable by the processor to:
 receive an input from a first person, wherein the input comprises at least one condition for delaying delivery of a message based on a body temperature, a heart rate, and a muscle activity of a second person, and at least one condition from a group of conditions comprising an activity determined using the home automation system, a time, a date, and geo location information;
 generate a message for the second person based at least in part on the input received from the first person, wherein the message includes at least one of a text message, an audible message, or a video message;
 receive, at the home automation system, data related to geo location information associated with one or more of the first person and the second person, wherein the data includes a direction of travel and the body temperature, the heart rate, and the muscle activity of the second person;
 estimate a time that the second person will view the message based at least in part on receiving the data related to the direction of travel and the body temperature, the heart rate, and the muscle activity of the second person;
 generate, at the home automation system, at least one condition for delaying delivery of the message to the second person based at least in part on estimating the time that the second person will view the message using the direction of travel and the body temperature, the heart rate, and the muscle activity of the second person;
 delay the delivery of the message based at least in part on generating the at least one condition; and
 deliver the message via the home automation system to the second person when the at least one condition is met.

11. The apparatus of claim 10, wherein the geo location information includes a change in location of the second person that receives the message.

12. The apparatus of claim 10, wherein the message is generated at a control panel of the home automation system and is delivered at the control panel.

13. The apparatus of claim 10, wherein delivering the message includes at least one of displaying a text or video and playing an audible message.

14. The apparatus of claim 10, wherein the at least one condition includes, in addition to geo location information, at least one of a time, a date, and an activity determined at least in part using the home automation system.

15. A computer-program product for communicating messages using a home automation system, the computer-program product comprising a non-transitory computer-readable medium storing instructions executable by a processor to:
 receive an input from a first person, wherein the input comprises at least one condition for delaying delivery of a message based on a body temperature, a heart rate, and a muscle activity of a second person, and at least one condition from a group of conditions comprising an activity determined using the home automation system, a time, a date, and geo location information;
 generate at least one message for the second person based at least in part on the input received from the first person, wherein the message includes at least one of a text message, an audible message, or a video message;
 receive, at the home automation system, data related to a direction of travel and the body temperature, the heart rate, and the muscle activity of the second person;
 estimate a time that the second person will view the message based at least in part on receiving the data related to the direction of travel and the body temperature, the heart rate, and the muscle activity of the second person;
 generate, at the home automation system, at least one condition for delaying delivery of the message to the second person based at least in part on estimating the time that the second person will view the message using the direction of travel and the body temperature, the heart rate, and the muscle activity of the second person;
 delay the delivery of the at least one message based at least in part on generating the plurality of conditions; and
 determine with the home automation system whether the plurality of conditions are met; and
 deliver the at least one message to at least the second person after determining that the plurality of conditions are met.

16. The computer-program product of claim 15, wherein the plurality of conditions includes geo location.

17. The computer-program product of claim 16, wherein the geo location is determined at least in part by a mobile computing device carried by one or more persons.

* * * * *